J. J. PFENNINGER.
MACHINE FOR DIVIDING DOUGH AND THE LIKE.
APPLICATION FILED OCT. 6, 1911.

1,039,795.

Patented Oct. 1, 1912.

2 SHEETS—SHEET 1.

WITNESSES:
W. H. Alexander.
B. L. Crowley

INVENTOR
J. J. Pfenninger
BY E. E. Haxfman
ATTORNEY

J. J. PFENNINGER.
MACHINE FOR DIVIDING DOUGH AND THE LIKE.
APPLICATION FILED OCT. 6, 1911.

1,039,795.

Patented Oct. 1, 1912.
2 SHEETS—SHEET 2.

WITNESSES:
W. A. Alexander,
B. L. Crowley

INVENTOR
J. J. Pfenninger.
BY
E. E. Hoffman
ATTORNEY

UNITED STATES PATENT OFFICE.

JOHN J. PFENNINGER, OF ST. LOUIS, MISSOURI.

MACHINE FOR DIVIDING DOUGH AND THE LIKE.

1,039,795.  Specification of Letters Patent.  Patented Oct. 1, 1912.

Application filed October 6, 1911.  Serial No. 653,088.

*To all whom it may concern:*

Be it known that I, John J. Pfenninger, a citizen of the United States, residing at St. Louis, Missouri, have invented a certain new and useful Machine for Dividing Dough and the Like, of which the following is such a full, clear, and exact description as will enable any one skilled in the art to which it appertains to make and use the same, reference being had to the accompanying drawings, forming part of this specification.

My invention relates to machines for dividing dough and the like into small pieces of uniform size, and is intended primarily for use in dividing a sheet of dough into pieces adapted to be used in pretzel making machines. It may, however, be used for any purpose where it is desirable to divide dough or similar material into small pieces of uniform size.

Machines for dividing a sheet of dough or similar material have been previously made in which the sheet of material was first divided longitudinally into strips and the strips then transversely divided while lying side by side. The objection to machines of this construction is that the strips of dough are expanded laterally by the knife which divides them transversely, so that the severed pieces are liable to be forced into contact so as to stick together. Another objection is that the pieces are so close together that even if they do not adhere, it is very difficult to have them fall properly upon the gang conveyers which convey them to the machines which are to operate upon them.

In practising my invention, I carry alternate strips of the material, after the sheet has been divided into strips, to different secondary conveyers where they are transversely divided. In this way I overcome the difficulties above referred to.

Figure 1:
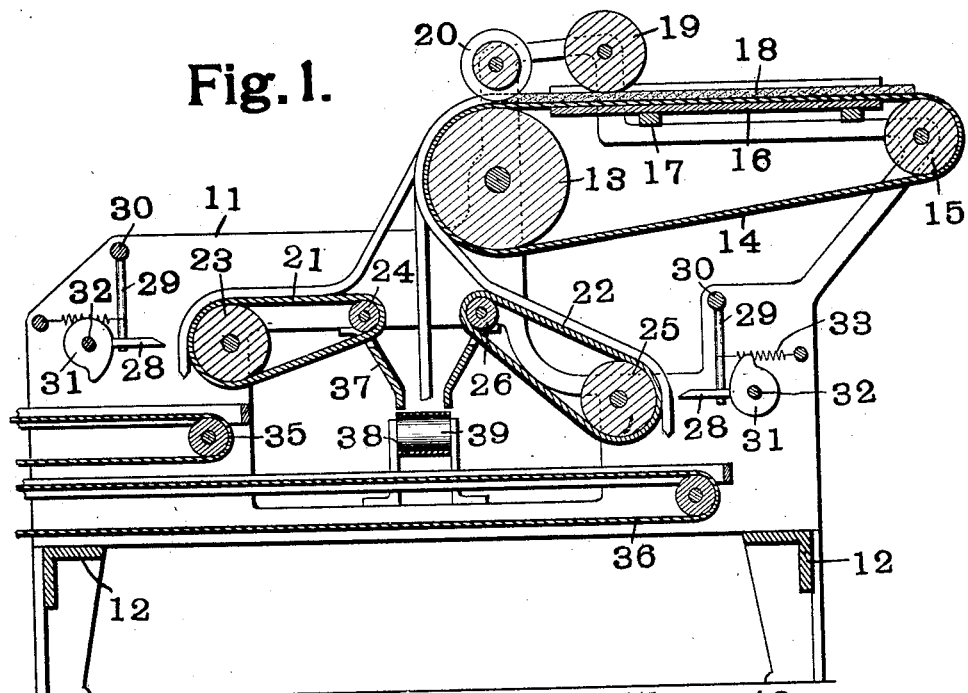
Figure 2:
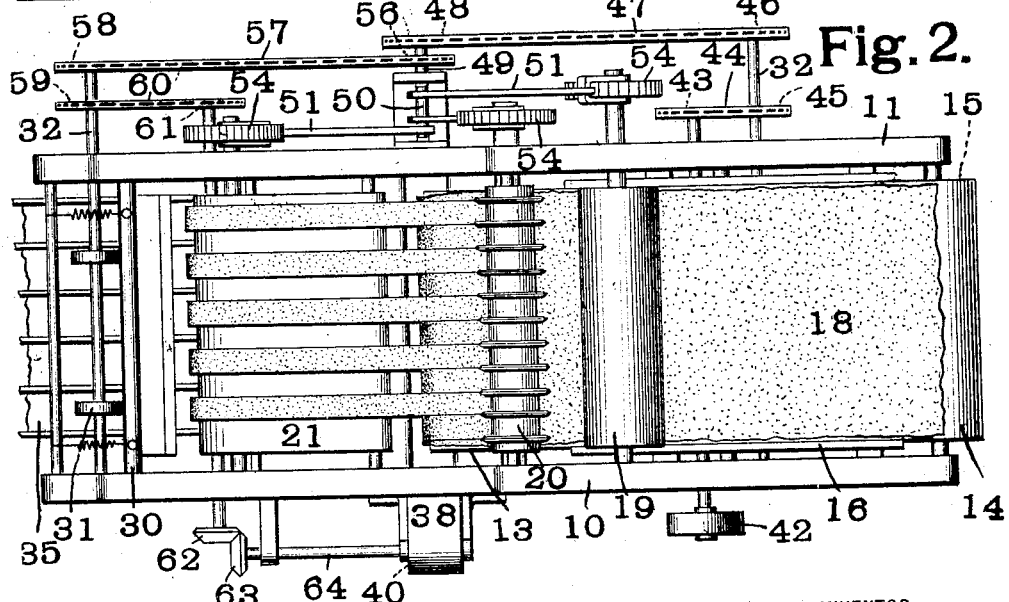
Figure 3:
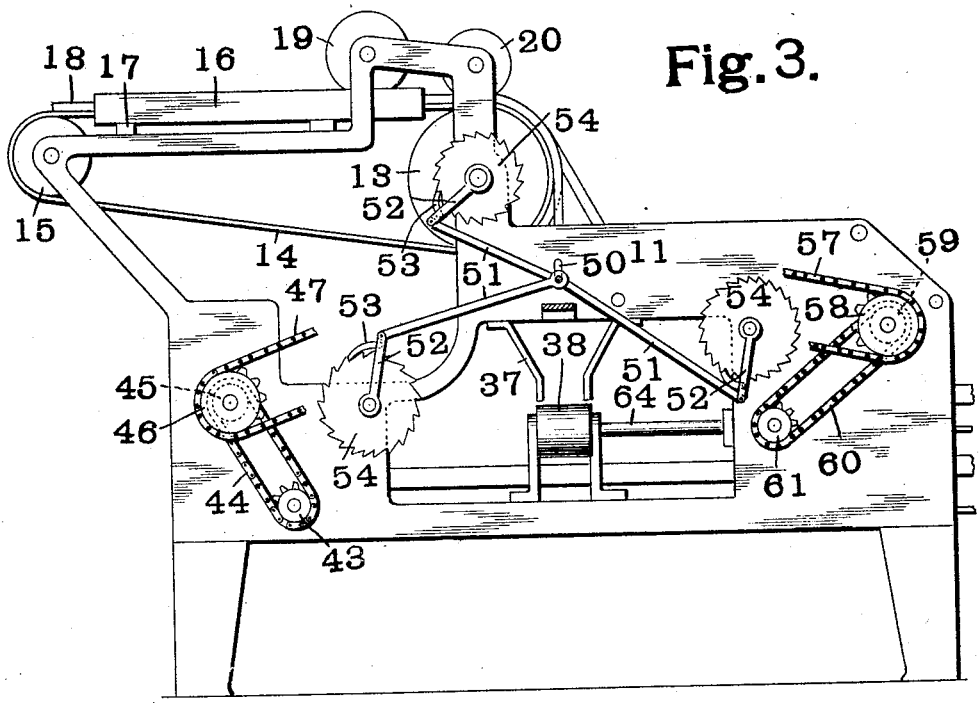
Figure 4:
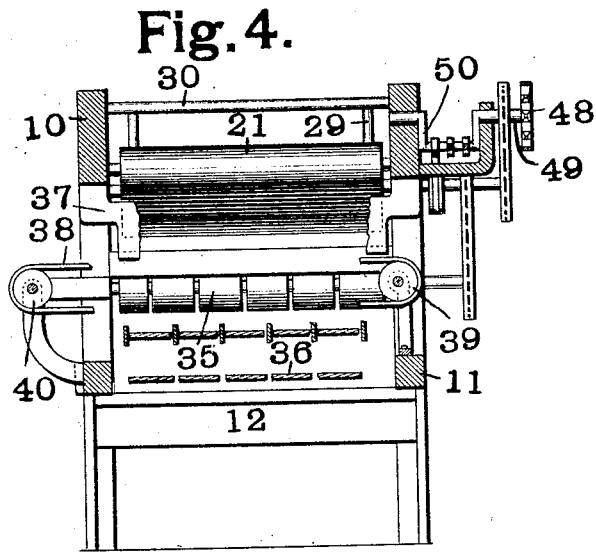

In the accompanying drawings, which illustrate one form of the machine made in accordance with my invention, Figure 1 is a vertical longitudinal section; Fig. 2 is a top plan view; Fig. 3 is a side elevation, and Fig. 4 is a central cross section.

Similar numerals of reference refer to the same parts in the several views of the drawings.

10 and 11 are the side frames of the machine. These frames 10 and 11 are connected by cross-bars 12. Journaled in the frames 10 and 11 is a main roll 13, which is surrounded by an endless belt 14 forming the main conveyer of the machine. This belt 14 also passes around a second roll 15. Extending between rolls 13 and 15 so as to support the upper strand of the belt 14, is a table 16 supported by cross-pieces 17 resting on the frames 10 and 11. The sheet of dough 18 is placed upon the belt 14 directly above the table 16. Arranged above the table 16 and adjacent the roll 13 is a roll 19 for reducing the sheet of dough 18 to uniform thickness. Coöperating with the main roll 13 are a series of rotary cutters 20 which divide the sheet of dough 18 into strips, which, in place of being severed against the main roll 13, as has been usual heretofore, are carried to a pair of secondary conveyers 21 and 22 respectively, alternate strips being carried to each conveyer. The conveyer 21 passes around a driving roll 23 and a roll 24, while the conveyer 22 passes around a driving roll 25 and a roll 26. Coöperating with the roll 23 and roll 25, respectively, are a pair of cutting blades 28. These blades 28 are suspended by means of rods 29 from rock shafts 30 and are actuated by means of cams 31 on shafts 32. The blades are held against the cams 31 by means of coil springs 33, as best shown in Fig. 1. Arranged below the driving roll 23 is a gang of conveyers 35 and below the roll 25 a similar gang of conveyers 36. These conveyers 35 and 36 are adapted to convey the pieces of dough severed from the strips by means of the blades 28. In order to convey the trimmed off edges of the sheet of dough laterally from the machine, I provide between the rolls 24 and 26 a trough 37 below which is a conveyer 38 which is mounted upon rolls 39 and 40, respectively.

In order to drive the machine I provide the driving shaft of the gang of conveyers 36 with a pulley 42 as shown in Fig. 2, around which the driving belt is passed. At the opposite end of the shaft is provided a sprocket wheel 43 around which passes a sprocket chain 44. This sprocket chain 44 also surrounds a sprocket wheel 45 upon the adjacent shaft 32. This shaft 32 is provided with a second sprocket wheel 46 around which passes a sprocket chain 47, which, in turn, passes around a sprocket 48 upon a short shaft 49 provided with a crank 50. This crank 50 is provided with three pitmen rods 51 which are each connected to an arm 52 provided with a pawl 53. These pawls 53 engage with wheels 54 which are mounted upon the shafts of the rolls 13, 23 and 25, respectively, so that as the shaft 49 is rotated, intermittent movement will be imparted to said rolls. The shaft 49 also has mounted upon it a sprocket wheel 56 around which passes a sprocket chain 57 which also passes around a sprocket wheel 58 upon the shaft 32 at the opposite end of the machine from the shaft 32 above referred to. This shaft 32 also has mounted upon it a sprocket wheel 59 around which passes a sprocket chain 60. This sprocket chain 60 also passes around a sprocket wheel 61 upon the shaft of the gang conveyer 35. The opposite end of this shaft is provided with a bevel gear wheel 62 meshing with the bevel gear wheel 63 upon a shaft 64 which carries the roll 40 driving the belt 38.

The operation of my machine will be obvious from the above description.

The sheet of dough 18 is placed upon the belt 14 above the table 16 and by the movement of said belt is carried under the roller 19 where it is rolled to a uniform thickness and then passes under the rotary cutters 20 which cut the dough into strips of uniform width. The trimmed edges of the dough pass directly from the roll 13 on to the transverse conveyer 38 where they are delivered laterally from the machine. The strips of dough into which the sheet is divided are led to the conveyers 21 and 22, respectively, alternate strips being led to each conveyer. The strips, as they pass around the rolls 23 and 25, respectively, are divided at uniform intervals into small pieces by means of the knives 28, and said strips are so far apart when this division occurs that they cannot possibly be spread into contact with each other, and, furthermore, the strips are small in comparison with the individual conveyers of the gangs of conveyers 35 and 36, and consequently they cannot fail to fall upon the proper conveyer.

It will be evident that by the gearing above described a continuous movement is imparted to the conveyers 35 and 36 and the shafts 32 which actuate the cutters while intermittent movement is communicated to the rolls 13, 23 and 25, so that the strips of dough are at rest while they are being operated upon by the cutters 28.

I claim:

1. In a machine for cutting dough and the like, the combination with a main conveyer, of means for cutting the dough into strips, a pair of secondary conveyers each adapted to receive alternate strips from said main conveyer, and means coöperating with each of said secondary conveyers for severing the strips transversely.

2. In a machine for cutting dough and the like, the combination with a main conveyer of means for cutting dough thereon into strips, a pair of secondary conveyers each adapted to receive alternate strips from said main conveyer, means coöperating with each of said secondary conveyers for severing the said strips transversely, and a transverse conveyer for removing the trimmed edges of the dough.

3. In a machine for cutting dough and the like, the combination of a main conveyer, means for cutting dough into strips, a pair of secondary conveyers each adapted to receive alternate strips from said main conveyer, means coöperating with each of said secondary conveyers for severing said strips transversely, and a transverse conveyer arranged between said secondary conveyers for receiving the trimmed edges of the dough.

4. In a machine for cutting dough and the like, the combination with a main conveyer, of means for cutting the dough into strips, a pair of secondary conveyers each adapted to receive alternate strips from said main conveyer, means for transversely dividing said strips, and a pair of conveyers arranged one above the other and adapted to receive the severed pieces from said secondary conveyers.

5. In a machine for cutting dough and the like, the combination with a main conveyer, of means for cutting the dough into strips, a pair of secondary conveyers arranged below and at opposite sides of the point of discharge of said main conveyer, and adapted to receive alternate strips therefrom, means for transversely dividing the strips, and conveyers for receiving the several pieces from said secondary conveyers.

6. In a machine for cutting dough and the like, the combination with a main conveyer of means for cutting the dough into strips, a pair of secondary conveyers arranged below and at opposite sides of the point of discharge of said main conveyer and adapted to receive alternate strips therefrom, a transverse conveyer arranged between said secondary conveyers and adapted to receive the trimmed edges of the dough, and a pair of conveyers arranged one above the other for receiving the severed strips from said secondary conveyers.

7. In a machine for cutting dough and the like, the combination with a main conveyer, of means for cutting the dough into strips, and a pair of secondary conveyers arranged below and at opposite sides of the point of discharge of said main conveyer and adapted to receive alternate strips therefrom, means for transversely dividing the said strips, a pair of gang conveyers for receiving the severed strips from said secondary conveyers, and gearing imparting an intermittent movement to said main and secondary conveyers and a continuous movement to said gang conveyers.

In testimony whereof, I have hereunto set my hand and affixed my seal in the presence of the two subscribing witnesses.

JOHN J. PFENNINGER. [L. S.]

Witnesses:
W. A. ALEXANDER,
B. L. CROWLEY.